(12) United States Patent
Zhang et al.

(10) Patent No.: US 8,248,459 B2
(45) Date of Patent: Aug. 21, 2012

(54) STEREOSCOPIC DISPLAY DEVICE WITH LIQUID CRYSTAL SHUTTER LIGHT FILTER FOR NAKED EYE VIEWING AND A DISPLAY METHOD THEREOF

(76) Inventors: Kaiming Zhang, Guangdong Province (CN); Zhaohong Zhang, Guangdong Province (CN); Wei Sun, Guangdong Province (CN)

( * ) Notice: Subject to any disclaimer, the term of this patent is extended or adjusted under 35 U.S.C. 154(b) by 1195 days.

(21) Appl. No.: 12/066,831

(22) PCT Filed: Jan. 25, 2007

(86) PCT No.: PCT/CN2007/000279
§ 371 (c)(1),
(2), (4) Date: Mar. 14, 2008

(87) PCT Pub. No.: WO2007/085194
PCT Pub. Date: Aug. 2, 2007

(65) Prior Publication Data
US 2008/0259156 A1   Oct. 23, 2008

(30) Foreign Application Priority Data
Jan. 27, 2006  (CN) .......................... 2006 1 0033346

(51) Int. Cl.
*H04N 13/02* (2006.01)
(52) U.S. Cl. ........................................... 348/46; 348/42
(58) Field of Classification Search ............... 348/42–60
See application file for complete search history.

(56) References Cited

U.S. PATENT DOCUMENTS

| | | | | |
|---|---|---|---|---|
| 5,036,385 A | * | 7/1991 | Eichenlaub | 348/59 |
| 7,319,720 B2 | * | 1/2008 | Abrams, Jr. | 375/240.12 |
| 2002/0015007 A1 | * | 2/2002 | Perlin et al. | 345/6 |
| 2005/0275942 A1 | * | 12/2005 | Hartkop et al. | 359/464 |

\* cited by examiner

*Primary Examiner* — Brendan Higa

(57) ABSTRACT

A stereoscopic display device with liquid crystal shutter light filter for naked eye viewing which comprises a personal computer and an image screen, wherein a dual display card is disposed inside the personal computer, and a light filtering screen is disposed in front of the image screen, and both the image screen and the light filtering screen connect with the dual display card respectively. Input the three-dimensional model data of a stereo image to the dual display card of the personal computer; and set the light filtering data and control the light filtering screen to open light filtering apertures correspondingly to obtain a light filtering image, and then use region projection method to record the stereo image as divided into partitions and obtain a continuous parallax image data, and then perform image processing on the continuous parallax image data to obtain a continuous parallax image, and the light filtering image and the continuous parallax image form a recording unit of the stereo image. Display the continuous parallax image on the image screen and the light filtering image on the light filtering screen simultaneously by the dual display card to see stereo image. The present invention has extensive applications. It is not required to wear any special glasses or helmets to view stereo images. It is also possible to move freely and view the stereo images from different perspective without causing any visual strain.

7 Claims, 12 Drawing Sheets

STEREOSCOPIC DISPLAY DEVICE WITH LIQUID CRYSTAL SHUTTER LIGHT FILTER FOR NAKED EYE VIEWING AND A DISPLAY METHOD THEREOF

BACKGROUND OF THE INVENTION

The present invention relates to an auto-stereoscopic display technology, particularly pertains to a stereoscopic display device with liquid crystal shutter light filter for naked eye viewing and a display method thereof.

After the introduction of photography more than a hundred years ago, with a view to imitate the left and right human eyes, men use two cameras to take photos of the same object simultaneously to obtain two photos with the parallax of the left eye and the right eye, namely the left eye view and the right eye view. By means of a slide viewer, the left and right human eyes are separated so that the left eye is only allowed to see the left eye view and the right eye is only allowed to see the right eye view. Through the synthesis of the brain a stereo image will appear before the viewer's eyes. This method forms the basis of modern stereo images generation.

There are many methods and theories of stereoscopic imaging. For example, with a view to imitate the left and the right human eyes, men use two video cameras to simultaneously shoot movies of the same object. The two movies are then projected simultaneously onto one screen. Viewers can then watch a stereoscopic movie by wearing a pair of special polarized glasses. Alternatively, by displaying the left eye view in the odd number lines and the right eye view in the even number lines of the electronic scanning lines of a television or computer monitor, viewers can then see stereoscopic images by wearing a pair of shutter glasses, wherein the left lens thereof is opened simultaneously with the odd number lines and the right lens thereof is opened simultaneously with the even number lines. Besides, there is also a kind of helmet-mounted display for viewers to wear, in which each of the left and right lenses takes the form of a small display. The left eye view is displayed in the left lens, and the right eye view is displayed in the right lens, so that viewers feel like entering a stereoscopic virtual environment. In the recent decade, a new stereoscopic display method for naked eye viewing has been devised, so that viewers can see stereo images without the need to wear any special apparatus (such as the said glasses and helmet). The basic theory of the stereoscopic display method for naked eye viewing is the use of a special picture on which all odd number lines are used to show a right eye view and all even number lines are used to show a left eye view. By setting a raster at a certain set position, the right eye can only see all the odd number lines of the picture and the left eye can only see all the even number lines of the picture, that is, the right eye can only see the right eye view and the left eye can only see the left eye view, and so viewers can directly see a stereo image.

In the book "Okoshi, T. 1976 Three-dimensional imaging techniques. New York: Academic Press", all methods and theories of stereoscopic imaging to date are described in detail. Apart from the laser holography method, all the above stereoscopic imaging methods share a common basis, that is obtaining one or more pairs of left eye and right eye parallax views by picturing or performing perspective projection on an object to produce various kinds of stereo images which can be viewed with or without glasses. They all share a common fatal disadvantage: since the left and right human eyes respectively view the left eye view and the right eye view, the stereoscopic movies and the stereo images cannot be viewed for a long period of time, or else it will cause physiological strain of the eyes.

BRIEF SUMMARY OF THE INVENTION

In view of the aforesaid disadvantages now present in the prior art, the object of the present invention is to provide a stereoscopic display device with liquid crystal shutter light filter for naked eye viewing which can generate stereo images on the screen which are viewable without the need to wear any special glasses or helmets. Viewers can move freely and view different sides of the stereo images from different perspectives without suffering from any visual strain.

Another object of the present invention is to provide a stereoscopic display method utilizing the stereoscopic display device with liquid crystal shutter light filter for naked eye viewing.

To attain these, the present stereoscopic display device with liquid crystal shutter light filter for naked eye viewing comprises a personal computer and an image screen, wherein a dual display card is disposed inside the personal computer, and a light filtering screen is disposed in front of the image screen, and both the image screen and the light filtering screen connect with the dual display card respectively.

To better attain the present invention, the image screen takes the form of various types of television displays or computer monitors including CRT, LCD, PDP, ELD and FED which are self-luminous or equipped with lighting systems.

The dual display card is a conventional graphics card for computer graphics processing which is capable of simultaneously displaying two images on two displays or monitors respectively.

The light filtering screen comprises a black and white liquid crystal panel and a light filtering panel. The light filtering panel is superposed onto the black and white liquid crystal panel. The light filtering panel is a thin panel with a plurality of light filtering apertures. The light filtering apertures are arranged in a two-dimensional matrix. The position of each light filtering aperture corresponds to that of each pixel of the black and white liquid crystal panel. The surface of the light filtering panel is black and opaque save for the light filtering apertures. Light can only pass through the light filtering apertures, thus forming a liquid crystal shutter light filtering screen.

The diameter of each light filtering aperture of the light filtering panel is 0.25-0.5 mm. During aperture imaging, the diameter of the light filtering aperture cannot be smaller than 0.1 mm, or else the diffraction of light when passing through the light filtering aperture would result in blurry images. On the contrary, if the diameter of the light filtering aperture is too big, light scattering occurs and the images would also become blurred. Experiments prove that the effect is the best when the diameter of the light filtering aperture is 0.2-0.5 mm. Small liquid crystal panels having pixel sizes of 0.264 mm or 0.297 mm can be used. However, the diameter of each pixel of a large liquid crystal panel (40 inches or above) is around 1 mm or even more, and using such large pixels to replicate stereo images results in poor effect. Using the light filtering panel to control the diameter of the light filtering aperture to be 0.25-0.5 mm will have a good effect on large screens.

The thickness of the light filtering panel is 0.1-1.0 mm. By using a thicker light filtering panel, the light filtering apertures will become tubular in shape. This can further reduce the background scattering light of an image and thereby resulting in clearer images.

A stereoscopic display method utilizing the stereoscopic display device with liquid crystal shutter light filter for naked eye viewing comprises the following steps:

(1) Obtain three-dimensional model data of a stereo image by a three-dimensional object scanner or artificial rendering, and then input the data to the dual display card of the personal computer, wherein the three-dimensional model data of the stereo image includes three-dimensional coordinates, color and brightness of all points representing the shape of an object's surface;

(2) Input light filtering data of a light filtering matrix to the dual display card of the personal computer wherein the light filtering data comprises the density of the light filtering matrix and the phase of the light filtering matrix, and then control the light filtering screen to open light filtering apertures corresponding to the light filtering data to obtain a light filtering image B, and then calculate and record the stereo image as divided into partitions by the use of region projection method by means of the personal computer to obtain continuous parallax image data, and then perform image processing on the continuous parallax image data by means of the personal computer to obtain a continuous parallax image W, and the light filtering image B and the continuous parallax image W form a recording unit R of the stereo image;

(3) Display the light filtering image of the recording unit on the light filtering screen and the continuous parallax image on the image screen simultaneously by means of the dual display card of the personal computer, and when light emitted from the continuous parallax image on the image screen passes through the light filtering apertures of the light filtering screen, viewers in front of the light filtering screen can see the stereo image replicated in space.

To better attain the present invention, the three-dimensional object scanner takes the form of a three-dimensional object laser scanner, a medical apparatus X-CT, RMI, a B supersonic diagnostic set, an engineering measuring instrument, and artificial rendering refers to the use of image processing software including 3DS MAX and MAYA to render stereo images.

According to the region projection method, the image screen is divided by means of the personal computer into recording partitions, each of which corresponds to each opened light filtering aperture on the light filtering screen, and the area in front of the light filtering screen is also divided into corresponding picturing partitions. Each recording partition is a rectangular area centering at the position of the corresponding opened light filtering aperture and with a width which is defined as the interval between each adjacent opened light filtering aperture. Each picturing partition is an area in front of the corresponding opened light filtering aperture on the light filtering screen which is in the shape of a quadrilateral pyramid with an apex defined as the corresponding opened light filtering aperture. The three-dimensional model data points of the stereo image located inside each picturing partition is projected to the corresponding recording partition through the corresponding light filtering aperture. For each three-dimensional model data point as projected on the image screen after passing through the light filtering aperture, the personal computer calculates the parameters and records the coordinates ($X_b$, $Y_b$), the color Col and the brightness L of each projected point in order to record the stereo image as divided into partitions and thereby obtaining continuous parallax image data W [$X_b$, $Y_b$, L, Col].

The coordinate $X_b$ of the projected point is expressed by the equation $X_b=X_i-(X_a-X_i)*Z_0/(Z_a-Z_0)$, where $X_a$ is the X-coordinate of the three-dimensional model data point, $X_i$ is the X-coordinate of the light filtering aperture of number i, $Z_a$ is the distance from the three-dimensional model data point to the image screen, $Z_0$ is the distance between the light filtering screen and the image screen, $X_b$ is the X-coordinate of $X_a$ on the image screen. The coordinate $Y_b$ of the projected point is expressed by the equation $Y_b=Y_i-(Y_a-Y_i)*Z_0/(Z_a-Z_0)$, where $Y_a$ is the Y-coordinate of the three-dimensional model data point, $Y_i$ is the Y-coordinate of the light filtering aperture of number i, $Z_a$ is the distance from the three-dimensional model data point to the image screen, $Z_0$ is the distance between the light filtering screen and the image screen, $Y_b$ is the Y-coordinate of $Y_a$ on the image screen.

The density of the light filtering matrix is expressed as G (M, N), wherein M indicates the number of pixels between each adjacent point of the matrix on X direction and N indicates the number of pixels between each adjacent point of the matrix on Y direction. Different densities of the light filtering matrixes result in different light filtering images. Based on different densities of the light filtering matrixes, the continuous parallax images as calculated based on the light filtering images are also different. The phase of the light filtering matrix is expressed as PH (I, J), wherein I indicates the number of pixels for which the matrix as a whole is translated on X direction and J indicates the number of pixels for which the matrix as a whole is translated on Y direction. The translated distance is expressed in pixels. For example, I=5 when the matrix as a whole is translated on X direction for 5 pixels, and J=5 when the matrix as a whole is translated on Y direction for 5 pixels.

If only a single recording unit is used to replicate a stereo image, viewers can only see the stereo image formed by a single light filtering matrix. The resolution of the stereo image is limited by the density of the light filtering matrix to a large extent. For example, with a light filtering screen having a density G (5, 0), for an LCD with a resolution of 1024×768, viewers can only see the stereo image of a horizontal frame resolution of 205 lines (1024/5=205). The result is obviously not satisfactory.

In order to enhance the resolution of the stereo image, in the steps (2) and (3), the stereo image is displayed by displaying multiple sets of recording units. This means a single frame HR is formed by m recording units R where the phase of each light filtering matrix of each recording unit R is different from each other, and when m light filtering matrixes of different phases coincide, the light filtering points of the light filtering matrixes fill all the light filtering apertures of the light filtering screen, and m recording units R of the single frame HR are displayed by the personal computer utilizing the dual display card at high speed according to their order numbers. In other words, when the light filtering images B and the continuous parallax images W of the m recording units are displayed simultaneously at high speed on the light filtering screen and the image screen respectively according to their order numbers, viewers in front of the light filtering screen can see the stereo image in high resolution.

When there are a plurality of different frames HR, m recording units R of each frame HR are displayed by the personal computer utilizing the dual display card at high speed according to their order numbers. In other words, the light filtering images B and the continuous parallax images W of the m recording units R are displayed simultaneously at high speed on the light filtering screen and the image screen respectively according to their order numbers. Viewers in front of the light filtering screen can see dynamic stereo images in high resolution.

Owing to the residual visual effect, the display time for displaying each frame HR at high speed is required to be ≦0.1 second, that is, the display time for displaying each recording unit R at high speed is required to be ≦0.1/m second for viewers to perceive complete and clear stereo images.

For example, for an LCD of a resolution of 1024×768, if only 1 recording unit R (with the density of the light filtering matrix being G (5, 0) and the phase of the light filtering matrix being PH (0, 0)) is used, a stereo image of a frame resolution of only 205×768 (1024/5=205) can be seen. If there are m=5 recording units R in a frame HR, and the densities of the light filtering matrixes are also G (5, 0) but the phases of the light filtering matrixes are PH (0, 0), PH (1, 0), PH (2, 0), PH (3, 0), PH (4, 0), PH (5, 0) respectively, then when the display time for displaying each recording unit R at high speed is ≦0.02 (0.1/5) second, 5 light filtering images B and 5 continuous parallax images W supplement each other and so viewers in front of the light filtering screen can see a stereo image of a resolution being enhanced by 5 times. The resolution of the stereo image is enhanced from 205×768 to 1024×768.

When there are a plurality of the recording units R and the phase of the light filtering matrix of each recording unit R is different, the order number of each recording unit R has to be sorted randomly without order. Each recording unit R is displayed according to the new order number after random sorting, so that the slanted stripes interference phenomenon on the screen caused by the illusion of eyes can be overcome.

The light filtering image can be a raster image with only vertical lines which is obtained through controlling the light filtering screen to open the light filtering apertures according to the vertical lines. Considering that human eyes generate stereo images mainly based on horizontal parallax, it is possible to consider the translation of the image on the horizontal direction only but not the translation of the image on the vertical direction, so that the workload for image data processing can be reduced by half.

In comparison with the prior art, the present invention has the following advantages and beneficial effects:

(1) The stereo image generated by the present device has a wide perspective and requires no special glasses. It can be viewed simultaneously by many people and it has a high resolution.

(2) The stereo image generated by the present device allows viewers to view different sides of the image from different perspectives.

(3) The stereo image generated by the present device allows viewers to view like viewing a real object, wherein the convergence angle and the focus of eyes naturally cooperate with each other and no visual strain or other uncomfortable feeling will be caused.

(4) The stereo image displayed by the present device can be used to generate a display scene which allows participation of many people and interaction between people and machines. It can also be used to generate a setting which is a virtual real environment for actors and viewers to stay together.

(5) The present device can be used in advertisement and amusement venues, electronic apparatus for games and stereo televisions. It can also be further used in extensive fields including scientific research, medical observation, engineering probing and so forth.

DETAILED DESCRIPTION OF THE INVENTION

The present invention is further described in detail with the following but not limited embodiment and the accompanying drawings.

The First Embodiment

Figure 1:
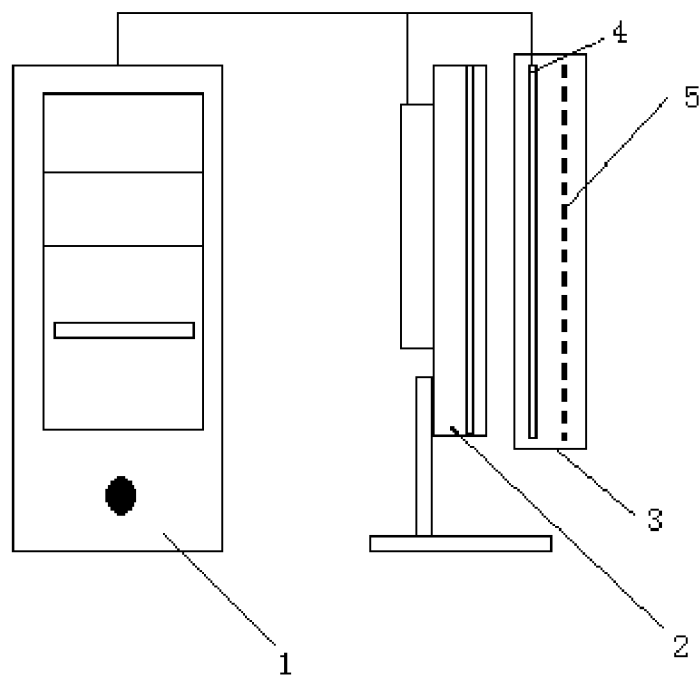
FIG. 1 shows the construction of the stereoscopic display device with liquid crystal shutter light filter for naked eye viewing of the present invention.

As illustrated in FIG. 1, the stereoscopic display device with liquid crystal shutter light filter for naked eye viewing comprises a personal computer 1, an image screen 2, a dual display card disposed inside the personal computer 1, and a light filtering screen 3 disposed in front of the image screen 2. Both the image screen 2 and the light filtering screen 3 connect with the dual display card respectively. The image screen 2 takes the form of various types of television displays or computer monitors including CRT, LCD, PDP, ELD and FED which are self-luminous or equipped with lighting systems. The dual display card is a conventional graphics card for computer graphics processing which is capable of simultaneously displaying two images, one on the light filtering screen and the other on the image screen, respectively.

Figure 2:
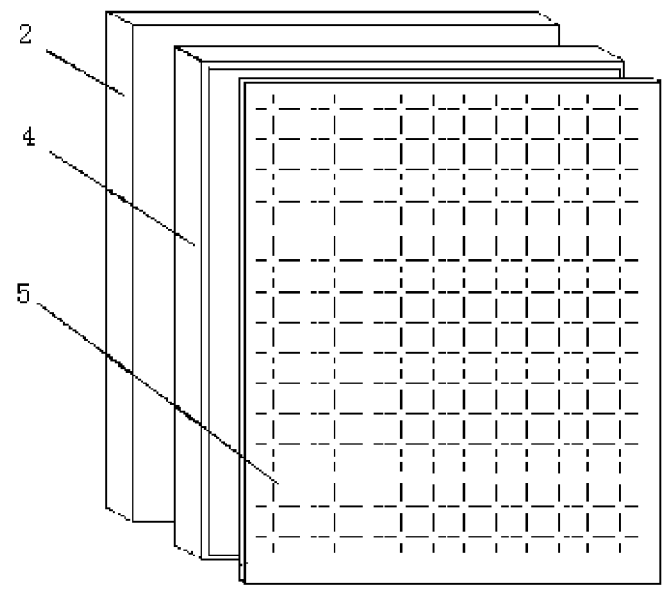
FIG. 2 shows the construction of the liquid crystal shutter light filtering screen as in FIG. 1.

As illustrated in FIG. 2, the light filtering screen 3 comprises a black and white liquid crystal panel 4 and a light filtering panel 5. The light filtering panel 5 is superposed onto the black and white liquid crystal panel 4. The light filtering panel 5 is a thin panel with a plurality of light filtering apertures. The light filtering apertures are arranged in a two-dimensional matrix. The position of each light filtering aperture corresponds to that of each pixel of the black and white liquid crystal panel. For example, if there are 1024×768 pixels in the black and white liquid crystal panel, there are also 1024×768 light filtering apertures in the light filtering screen correspondingly, with each light filtering aperture corresponding to each pixel. Save for the light filtering apertures, the surface of the light filtering panel is black and opaque so that light can only pass through the light filtering apertures. A liquid crystal shutter light filtering screen is formed by controlling the pixels of the black and white liquid crystal panel to be light transparent or opaque which in turn controlling the light filtering apertures on the light filtering screen to be light transparent or opaque. The diameter of each light filtering aperture of the light filtering panel is 0.25-0.5 mm. The thickness of the light filtering panel is 0.1-1.0 mm.

The Second Embodiment

The present stereoscopic display method utilizing the stereoscopic display device with liquid crystal shutter light filter for naked eye viewing comprises the following steps:

(1) Obtain three-dimensional model data of a stereo image by a three-dimensional object scanner or artificial rendering, and then input the data to the dual display card of the personal computer. The three-dimensional object scanner may take the form of a three-dimensional object laser scanner, a medical apparatus X-CT, RMI, a B supersonic diagnostic set, an engineering measuring instrument. "Artificial rendering" refers to the use of image processing software including 3DS MAX, MAYA to render stereo images. Three-dimensional model data of a stereo image includes three-dimensional coordinates, color and brightness of all points representing the shape of an object's surface;

(2) Input light filtering data B[G (M, N), PH (I, J)] to the dual display card of the personal computer and control the liquid crystal shutter light filtering screen to open light filtering apertures corresponding to the light filtering data to obtain a light filtering image B, and then calculate and record the stereo image as divided into partitions by the use of region projection method by means of the personal computer to obtain continuous parallax image data W[Xb,Yb, L, Col], and then perform image processing on the continuous parallax image data W[Xb, Yb, L, Col] by means of the personal computer to obtain a continuous parallax image W. The light filtering image B and the continuous parallax image W form a recording unit R of the stereo image which is recorded as R{W [Xb, Yb, L, Col], B[G (M, N), PH (I, J)]}.

The light filtering data B[G (M, N), PH (I, J)] comprises the density of the light filtering matrix G (M, N) and the phase of the light filtering matrix PH (I, J), wherein M indicates the number of pixels between each adjacent point of the matrix on X direction, N indicates the number of pixels between each adjacent point of the array on Y direction, I indicates the number of pixels for which the matrix as a whole is translated on X direction, J indicates the number of pixels for which the matrix as a whole is translated on Y direction.

Figure 3A:
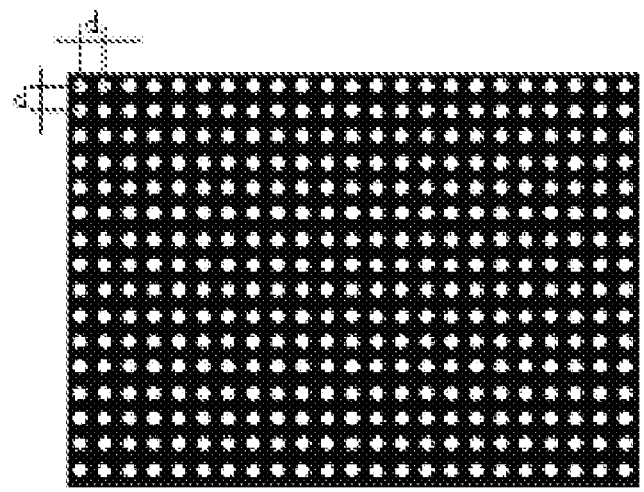
FIGS. 3(a), (b), (c) and (d) are schematic diagrams showing the operation of the liquid crystal shutter light filtering screen.
Figure 3B:
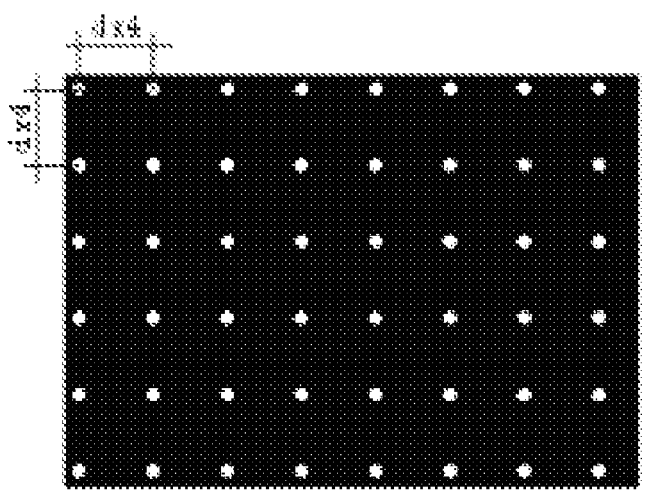
Figure 3C:
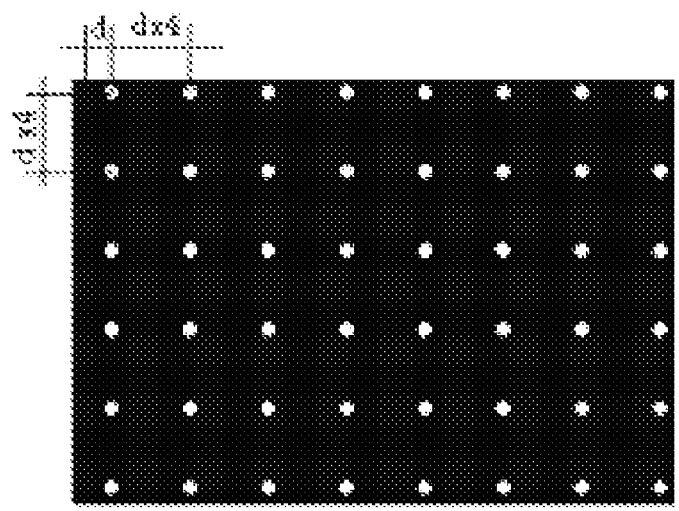
Figure 3D:
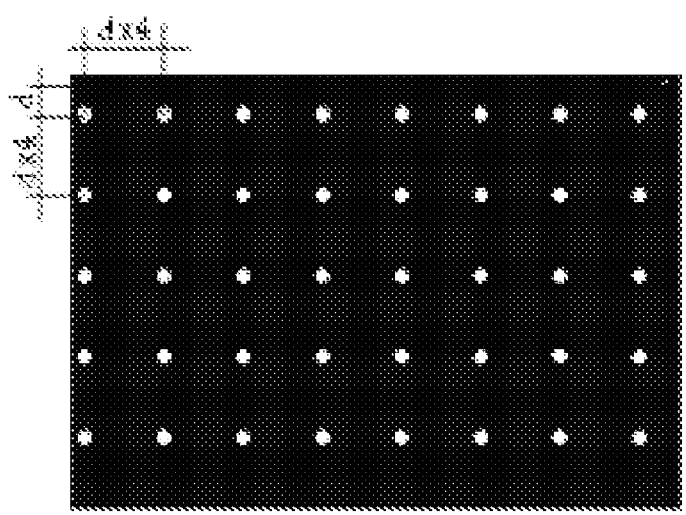

FIG. 3(a) shows the light filtering screen when the entire black and white liquid crystal panel is opened. At this time, all light filtering apertures are light-transparent. The distance between each adjacent light-transparent point horizontally and vertically is d where d=1 mm. The density of the light filtering matrix is G (1, 1). The phase of the light filtering matrix is PH (0, 0). FIG. 3(b) shows the light filtering screen when the black and white liquid crystal panel is opened at an interval of three points. At this time, only 1/16 of the light filtering apertures are light-transparent. The distance between each adjacent light-transparent point horizontally and vertically is 4 mm. The density of the light filtering matrix is G (3, 3). The phase of the light filtering matrix is PH (0, 0). FIG. 3(c) shows the light filtering screen when the black and white liquid crystal panel is also opened at an interval of three points. The distance between each adjacent light-transparent point horizontally and vertically is 3 mm, but the light-transparent matrix as a whole is translated towards the right for a distance of 1 mm. The density of the light filtering matrix is G (3, 3). The phase of the light filtering matrix is PH (1, 0). FIG. 3(d) shows the light filtering screen when the black and white liquid crystal panel is also opened at an interval of three points. The distance between each adjacent light-transparent point horizontally and vertically is 3 mm, but the light-transparent matrix as a whole is translated towards the bottom for a distance of 1 mm. The density of the light filtering matrix is G (3, 3). The phase of the light filtering matrix is PH (0, 1).

Figure 4A:
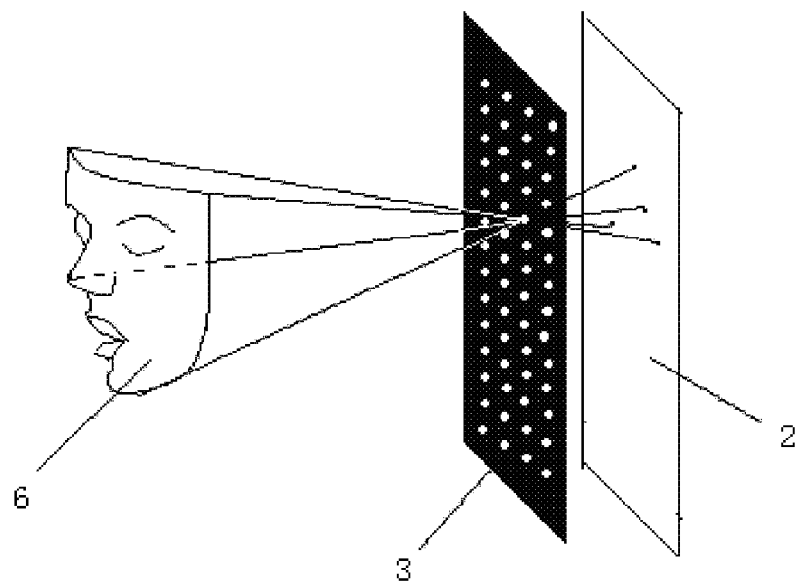
FIGS. 4(a) and (b) are diagrams showing the principle of the region projection method.

As illustrated in FIG. 4(a), a stereo image 6 is projected to the image screen 2 through a light filtering aperture of the light filtering screen 5. Similar to photography, every light filtering aperture on the light filtering screen 5 is similar to a camera lens. Normal photography is to picture at the object, while the region projection method is to picture from the back of the object. However, if the stereo image is projected against each light filtering aperture without any restriction, the images projected on the image screen 2 will be overlapped against each other, resulting in the failure to generate the correct image.

Figure 4B:
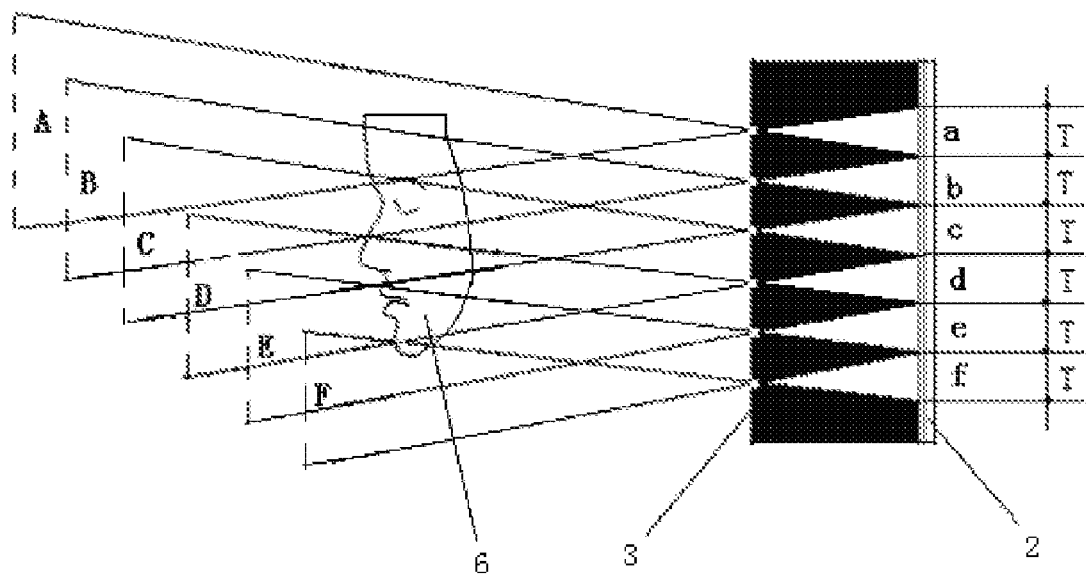

As illustrated in FIG. 4(b), according to the region projection method, the image screen 2 is divided by means of the personal computer into recording partitions a, b, c, d, e, f . . . , each of which corresponds to each opened light filtering aperture on the light filtering screen, and the area in front of the light filtering screen 5 is also partitioned into corresponding picturing partitions A, B, C, D, E, F . . . . Each recording partition is a rectangular area centering at the position of the corresponding opened light filtering aperture and with a width which is defined as the interval between each adjacent opened light filtering aperture. Each picturing partition is an area in front of the corresponding opened light filtering aperture on the light filtering screen which is in the shape of a quadrilateral pyramid with an apex defined as the corresponding opened light filtering aperture. The three-dimensional model data points of the stereo image 6 located inside each picturing partition can be projected to the corresponding recording partition through the corresponding light filtering aperture. For each three-dimensional model data point as projected on the image screen 2 after passing through the light filtering aperture, the personal computer calculates the parameters and records the coordinates (Xb, Yb), the color Col and the brightness L of each projected point in order to record the stereo image as divided into partitions and thereby obtaining continuous parallax image data W [Xb,Yb, L, Col].

Figure 5A:
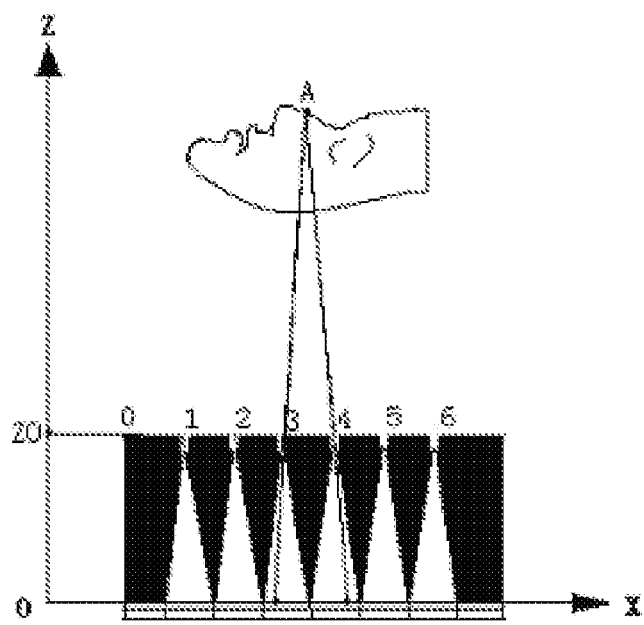
FIG. 5 is a diagram showing the calculation of the coordinates of the projected point.

As illustrated in FIGS. 5(a), (b), the algorithm for calculating the coordinates (Xb, Yb) of the projected points is as follows. First, assume there is a light spot A in the space. The Xb value of the point as projected by the light spot A on the image screen can be expressed by the following equation: $Xb=X3-(Xa-X3)*Z0/(Za-Z0)$, wherein:

Xa: the X-coordinate of the light spot A;

X3: the X-coordinate of the light filtering aperture of number 3;

Za: the distance from the light spot A to the image screen;

Z0: the distance between the light filtering screen and the image screen;

Xb: the X-coordinate of Xa on the image screen.

Similarly, the Yb value of the point as projected by the light spot A on the image screen can be expressed by the following equation: $Yb=Y3-(Ya-Y3)*Z0/(Za-Z0)$, wherein:

Ya: the Y-coordinate of the light spot A;

Y3: the Y-coordinate of the light filtering aperture of number 3;

Za: the distance from light spot A to the image screen;

Z0: the distance between the light filtering screen and the image screen;

Yb: the Y-coordinate of Ya on the image screen.

Figure 6:
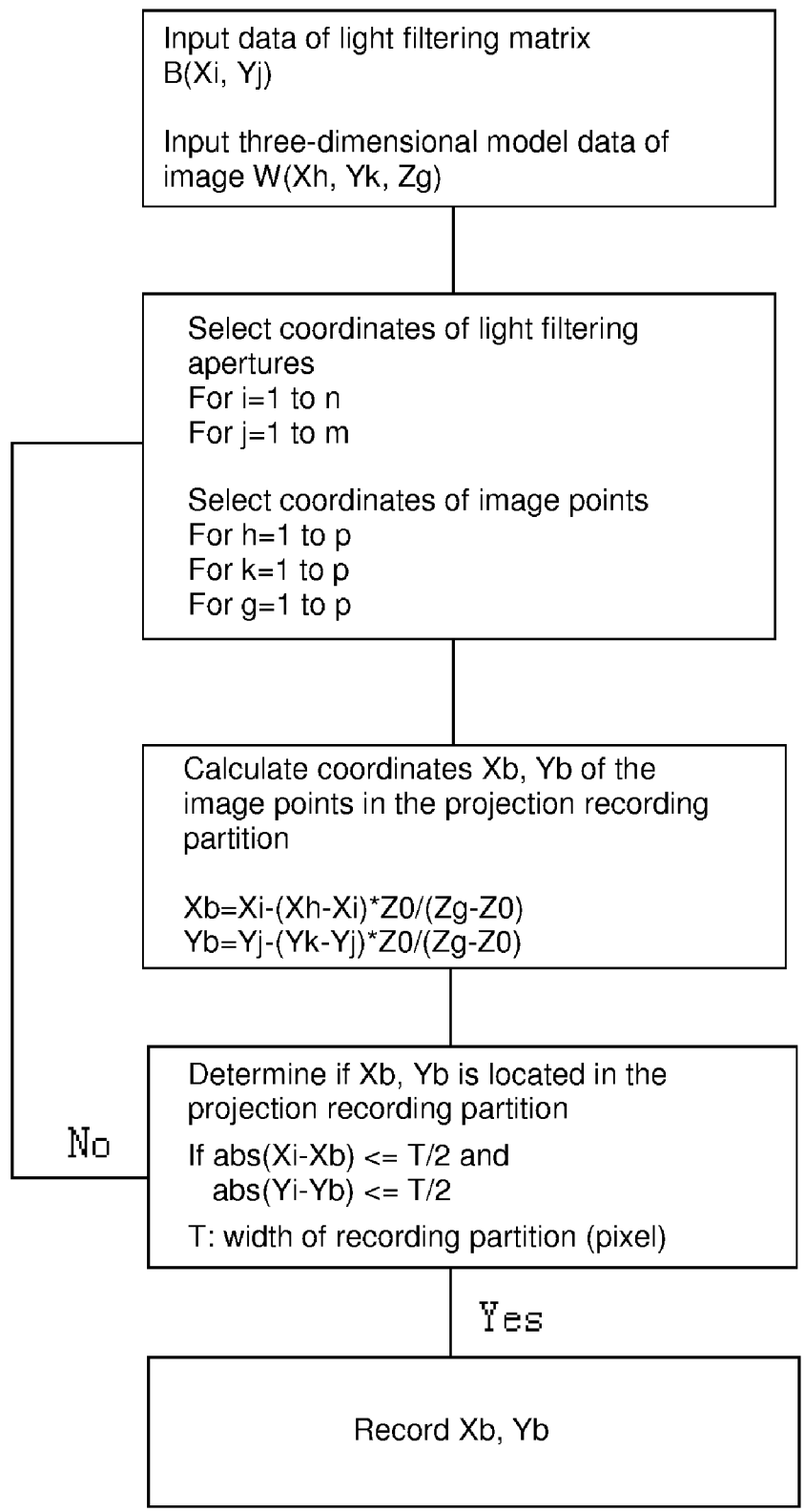
FIG. 6 is a flow chart showing the algorithm of the region projection method.

FIG. 6 is a flow chart showing the algorithm of the region projection method. A surface of a stereo image can be represented by many indicating points. For each indicating point, calculate the coordinates (Xb, Yb), the brightness L and the color Col of the point as projected on the recording partition in order to obtain a set of continuous parallax image data W [Xb, Yb, L, Col] for the entire stereo image and then record the recording unit R as:

R {W [Xb, Yb, L, Col], B [G (M, N), PH (I, J)]}

Figure 7:
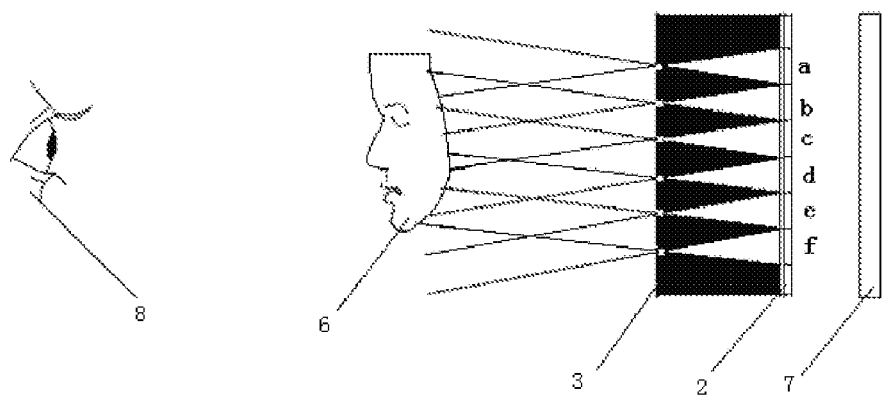
FIG. 7 is a diagram showing the principle of the replication of the stereo image.

(3) As illustrated in FIG. 7, input a recording unit R to the personal computer first. By means of the dual display card, transform the continuous parallax image data W of the recording unit R to a continuous parallax image W and display the continuous parallax image W on the image screen 2, and transform the light filtering data B of the recording unit R to a light filtering image B and display the light filtering image B on the light filtering screen 3. The light source 7 of the image screen 2 projects the images of recording partitions a, b, c, d, e, f to the area in front of the light filtering screen 3 through the light filtering apertures of the light filtering screen 3. Viewers 8 in front of the light filtering screen can therefore see a stereo image 6 replicated in the space.

The resolution of a stereo image which could be displayed by a recording unit R mainly depends on the density of the light filtering matrix, the larger the numbers M and N in G(M, N), the lower the density of the light filtering matrix, and the lower the resolution of the stereo image as replicated, and vice versa.

Figure 8:
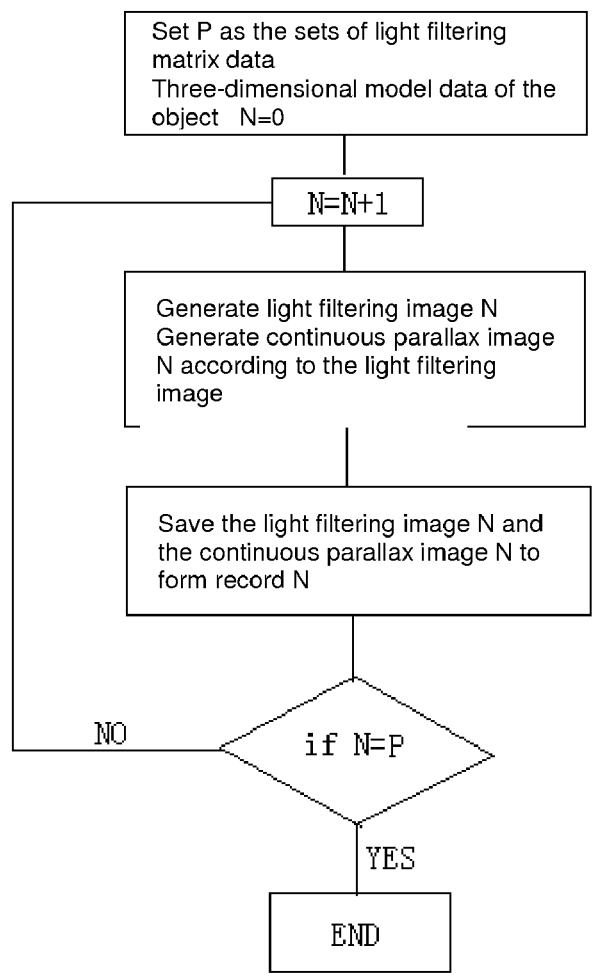
FIG. 8 is a flow chart showing the algorithm for generating multiple recording units.

In order to enhance the resolution of the stereo image, the stereo image has to be displayed by displaying multiple sets of recording units. As illustrated in FIG. 8, m recording units R are generated by setting m light filtering matrixes with different phases in the dual display card of the personal computer. For example, when m=4, 4 recording units R are generated. The density of each light filtering matrix is identical to each other as follows:

| G1 (2, 2) | G2 (2, 2) | G3 (2, 2) | G4 (2, 2) |
|---|---|---|---|

However, the phase of each light filtering matrix is different from each other as follows:

| PH1 (2, 2) | PH2 (1, 2) | PH3 (1, 1) | PH4 (2, 1) |
|---|---|---|---|

As a result, 4 light filtering images B with different phases are obtained as follows:
B1 [G 1(2, 2), PH1 (2, 2)]
B2 [G 2(2, 2), PH2 (1, 2)]
B3 [G 3(2, 2), PH3 (1, 1)]
B4 [G 4(2, 2), PH4 (2, 1)]

4 corresponding continuous parallax images W corresponding to the 4 light filtering images are obtained as follows:
W1 [X, Y, L, Col]
W2 [X, Y, L, Col]
W3 [X, Y, L, Col]
W4 [X, Y, L, Col]

Figure 9A:
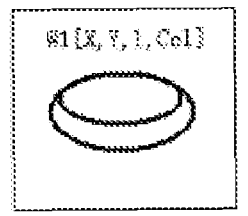
FIGS. 9(a), (b), (c) and (d) are respectively the light filtering images and the continuous parallax images of four recording units.
Figure 9A:
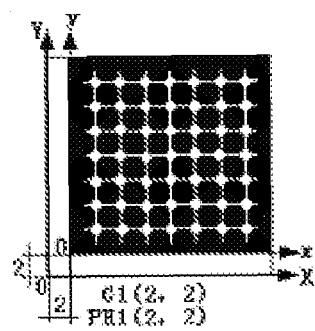
Figure 9B:
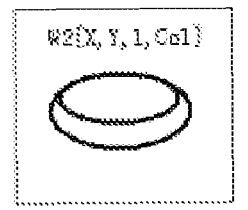
FIG. 9(e) is a schematic diagram illustrating the visual effect achieved by displaying alternately in high speed.
Figure 9B:
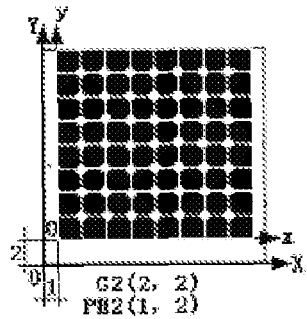
Figure 9C:
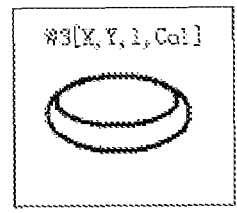
Figure 9C:
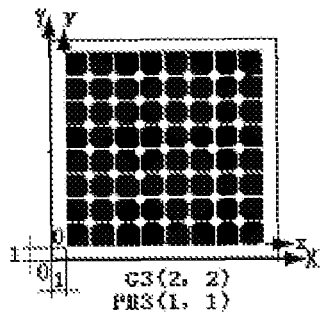
Figure 9D:
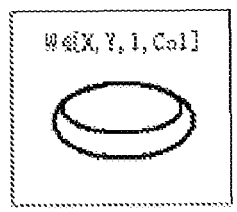
Figure 9D:
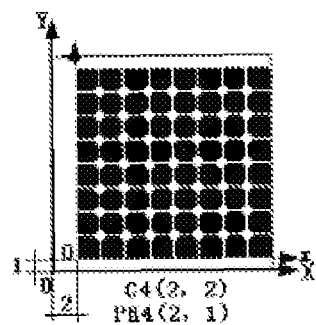

As illustrated in FIGS. 9(a), (b), (c) and (d), 4 light filtering images B and 4 continuous parallax images W respectively form 4 recording units R. 4 recording units R form a single frame record HR which comprises:
Record R1 {W1 [X, Y, L, Col], B1 [G1 (2, 2), PH1 (2, 2)]}
Record R2 {W2 [X, Y, L, Col], B2 [G2 (2, 2), PH2 (1, 2)]}
Record R3 {W3 [X, Y, L, Col], B3 [G3 (2, 2), PH3 (1, 1)]}
Record R4 {W4 [X, Y, L, Col], B4 [G4 (2, 2), PH4 (2, 1)]}

Figure 9E:
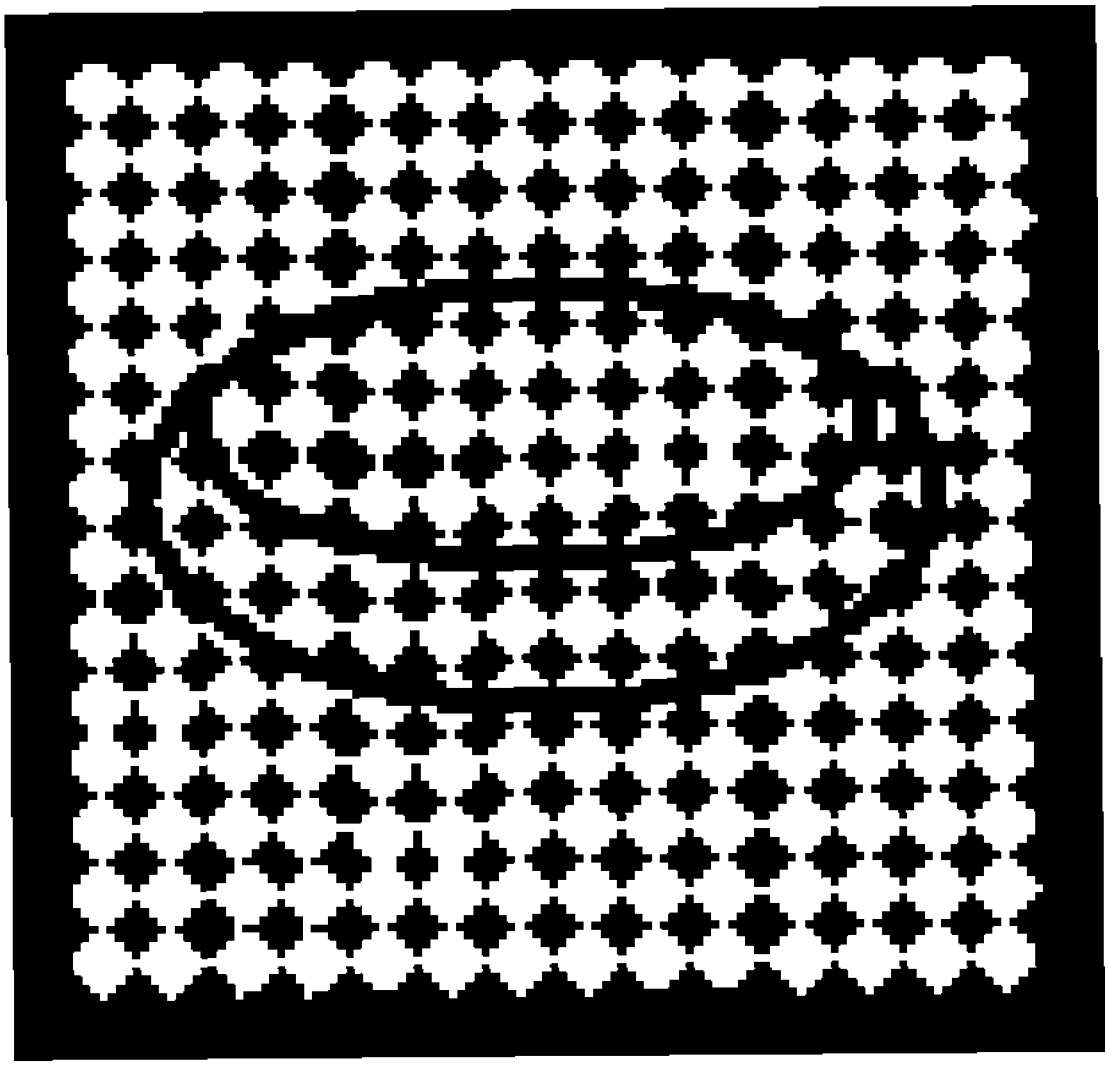

As illustrated in FIG. 9(e), 4 recording units R of the frame HR are displayed by the personal computer utilizing the dual display card at high speed according to their order numbers. In other words, the light filtering images B and the continuous parallax images W of the 4 recording units R are displayed simultaneously at high speed on the light filtering screen and the image screen respectively according to their order numbers. When the display time for displaying each recording unit R at high speed is $\leq 0.025$ (0.¼) second, the stereo images formed by 4 recording units R supplement each other owing to the residual visual effect, and so viewers in front of the light filtering screen can see the stereo image of a resolution being enhanced by 4 times.

When there are a plurality of frames HR, m recording units R of each frame HR are displayed by the personal computer utilizing the dual display card at high speed according to their order numbers. In other words, the light filtering images B and the continuous parallax images W of the m recording units R are displayed simultaneously at high speed on the light filtering screen and the image screen respectively according to their order numbers. When the display time is $\leq 0.1/m$ second, owing to the residual visual effect, viewers in front of the light filtering screen can see the dynamic stereo images in high resolution.

When generating a plurality of recording units R with different light filtering phases, the phases are always arranged in square matrix to facilitate design. For example, when using 16 light filtering matrixes with different phases, their phases in square matrix and their order numbers P are arranged as follows:

| 1 PH (0, 0) | 2 PH (0, 1) | 3 PH (0, 2) | 4 PH (0, 3) |
|---|---|---|---|
| 5 PH (1, 0) | 6 PH (1, 1) | 7 PH (1, 2) | 8 PH (1, 3) |
| 9 PH (2, 0) | 10 PH (2, 1) | 11 PH (2, 2) | 12 PH (2, 3) |
| 13 PH (3, 0) | 14 PH (3, 1) | 15 PH (3, 2) | 16 PH (3, 3) |

When the light filtering image B and the continuous parallax image W are simultaneously displayed on the light filtering screen and the image screen respectively at high speed according to their order numbers, and when 16 recording units R are transformed to stereo images according to the order numbers P from 1 to 16, slanted stripes moving from the top left to the bottom right will appear on the light filtering screen owing to visual illusion effects.

Figure 10:
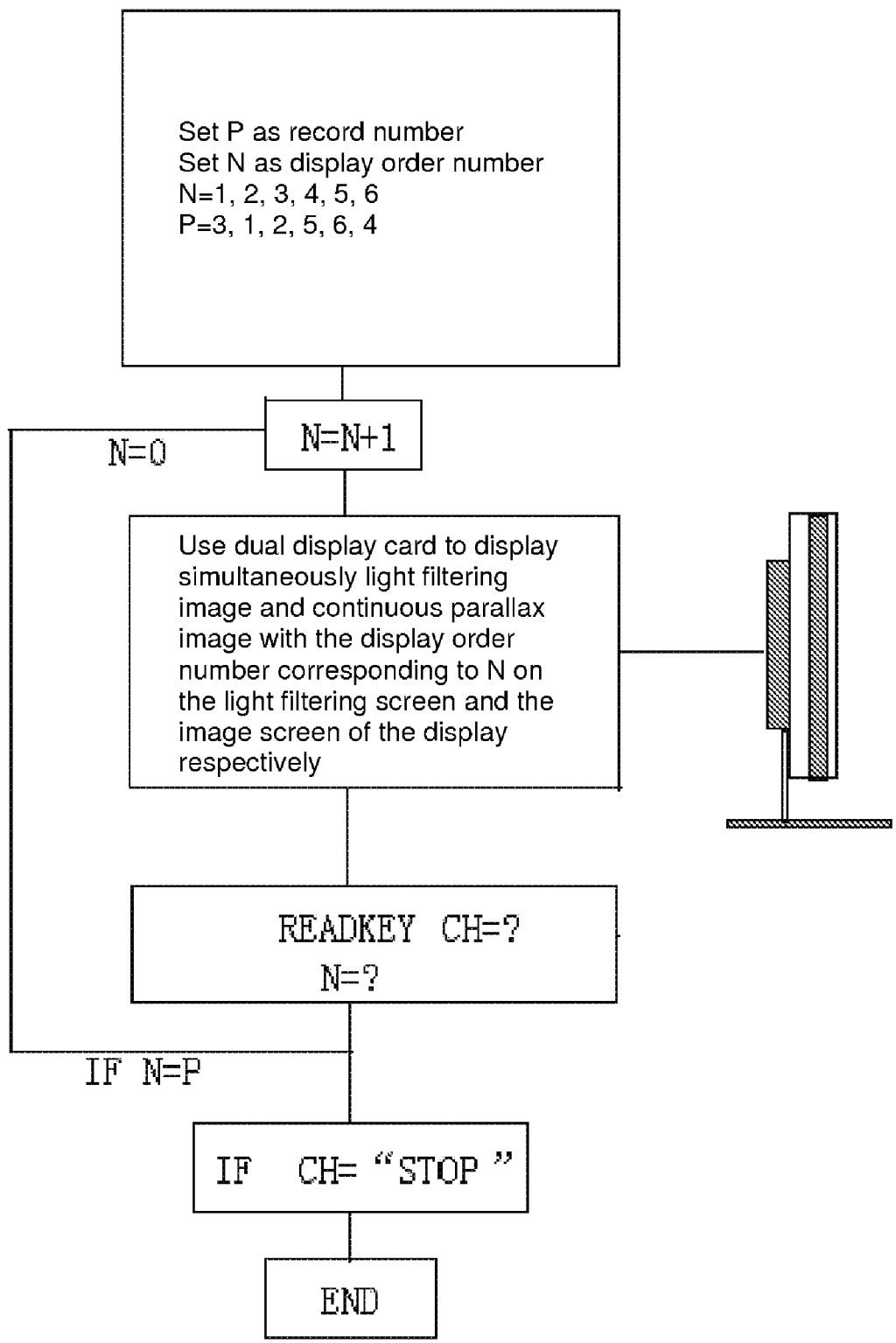
FIG. 10 is a flow chart showing the algorithm of transforming multiple recording units into stereo images and eliminating slanted stripes interference.

To overcome this interference phenomenon, as illustrated in FIG. 10, order numbers P of the recording units R have to be sorted randomly without order:
Display numbers N: 1 2 3 4 5 6 7 8 9 10 11 12 13 14 15
The original order numbers P: 1 12 2 11 3 10 4 9 5 16 6 15 7 10 8 9

After the 16 recording units R have been sorted randomly without order, the light filtering images B and the continuous parallax images W are displayed simultaneously on the light filtering screen and the image screen respectively at high speed according to their display numbers. The slanted stripes interference phenomenon caused by the visual illusion effects can be overcome.

Figure 5B:
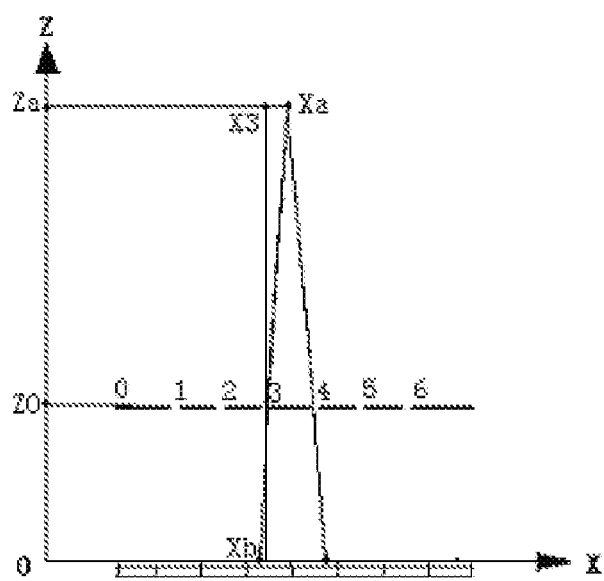
Figure 11:
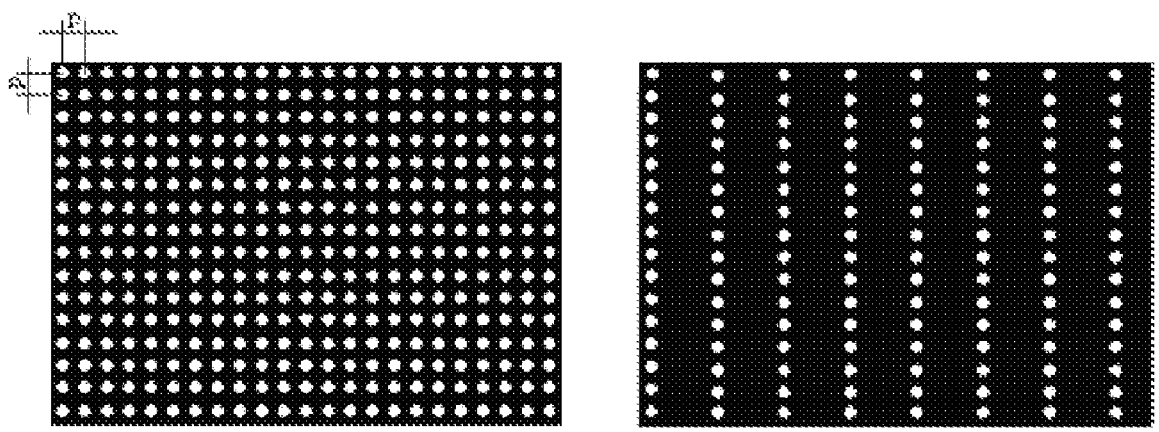
FIG. 11 is a schematic view showing the light filtering being transformed into a raster.

As illustrated in FIG. 11, the light filtering image is a raster image with vertical lines only which is obtained by controlling the light filtering screen to open the light filtering apertures according to the vertical lines. Considering that human eyes generate stereo images mainly based on horizontal parallax, it is possible to consider the translation of the image on X direction only but not the translation of the image on Y direction during projection calculation as in FIG. 5, so that the calculation workload can be reduced by half.

For example, when m=5, 5 recording units are generated, and the raster line is translated towards the right for a distance of 1 light filtering aperture when a preceding raster image is compared to a succeeding raster image.

The phase of the first raster matrix is PH1 (0, 0), calculate and obtain a continuous parallax image W1, a light filtering image B1, and obtain a recording unit R1;

The phase of the second raster matrix is PH2 (1, 0), calculate and obtain a continuous parallax image W2, a light filtering image B2, and obtain a recording unit R2;

The phase of the third raster matrix is PH3 (2, 0), calculate and obtain a continuous parallax image W3, a light filtering image B3, and obtain a recording unit R3;

The phase of the fourth raster matrix is PH4 (3, 0), calculate and obtain a continuous parallax image W4, a light filtering image B4, and obtain a recording unit R4;

The phase of the fifth raster matrix is PH5 (4, 0), calculate and obtain a continuous parallax image W5, a light filtering image B5, and obtain a recording unit R5.

5 recording units which form a single frame HR is thereby obtained. The 5 recording units R of the frame HR are displayed by personal computer utilizing the dual display card at high speed according to their order numbers. In other words, the light filtering images B and the continuous parallax images W of the 5 recording units R are displayed simultaneously at high speed on the light filtering screen and the image screen respectively according to their order numbers. When the display time for displaying each recording unit R at high speed is $\leq 0.02$ (0.1/5) second, the stereo images formed by 5 recording units R supplement each other owing to the residual visual effect, and so viewers in front of the light filtering screen can see the stereo image of a resolution being enhanced by 5 times.

The present invention can be better attained through the above descriptions.

What is claimed is:

1. A stereoscopic display method utilizing a stereoscopic display device with liquid crystal shutter light filter for naked eye viewing comprises the following steps:
   (1) Obtain three-dimensional model data of a stereo image by a three-dimensional object scanner or artificial rendering, and then input the three-dimensional model data to a dual display card of a personal computer, wherein the three-dimensional model data of the stereo image includes three-dimensional coordinates, color and brightness of all points representing the shape of an object's surface;
   (2) Input light filtering data of a light filtering matrix to the dual display card of the personal computer, wherein the light filtering data comprises a density of the light filtering matrix and a phase of the light filtering matrix, and then control a light filtering screen to open light filtering apertures corresponding to the light filtering data to obtain a light filtering image B, and then calculate and record the stereo image as divided into partitions by the use of a region projection method by means of the personal computer to obtain continuous parallax image data, and then perform image processing on the continuous parallax image data by means of the personal computer to obtain a continuous parallax image W, and the light filtering image B and the continuous parallax image W form a recording unit R of the stereo image;
   (3) Display the continuous parallax image of the recording unit on an image screen and the light filtering image on the light filtering screen simultaneously by means of the dual display card of the personal computer, and when light emitted from the continuous parallax image on the image screen passes through the light filtering apertures of the light filtering screen, viewers in front of the light filtering screen can see the stereo image replicated in space.

2. The stereoscopic display method utilizing the stereoscopic display device with liquid crystal shutter light filter for naked eye viewing as in claim 1, wherein the three-dimensional object scanner takes the form of a three-dimensional object laser scanner, a medical apparatus X-CT, RMI, a B supersonic diagnostic set, an engineering measuring instrument, and artificial rendering refers to the use of image processing software including 3DMS MAX and MAYA to render stereo images.

3. The stereoscopic display method utilizing the stereoscopic display device with liquid crystal shutter light filter for naked eye viewing as in claim 1, wherein according to the region projection method, the image screen is divided by means of the personal computer into recording partitions, each of which corresponds to each opened light filtering aperture on the light filtering screen, and an area in front of the light filtering screen is also divided into corresponding picturing partitions; each recording partition is a rectangular area centering at the position of the corresponding opened light filtering aperture and with a width which is defined as the interval between each adjacent opened light filtering aperture; each picturing partition is an area in front of the corresponding opened light filtering aperture on the light filtering screen which is in the shape of a quadrilateral pyramid with an apex defined as the corresponding opened light filtering aperture; the three-dimensional model data points of the stereo image located inside a picturing partition is projected to a corresponding recording partition through the corresponding light filtering aperture; for each three-dimensional model data point as projected on the image screen after passing through the light filtering aperture, the personal computer calculates parameters and records coordinates (Xb, Yb), color Col and brightness L of each projected point in order to record the stereo image as divided into partitions and thereby obtaining continuous parallax image data W [Xb, Yb, L, Col].

4. The stereoscopic display method utilizing the stereoscopic display device with liquid crystal shutter light filter for naked eye viewing as in claim 3, wherein the coordinate Xb of the projected point is expressed by the equation Xb=Xi−(Xa−Xi)*Z0/(Za−Z0), where Xa is the X-coordinate of the three-dimensional model data point, Xi is the X-coordinate of the light filtering aperture of number i, Za is the distance from the three-dimensional model data point to the image screen, Z0 is the distance between the light filtering screen and the image screen, Xb is the X-coordinate of Xa on the image screen; the coordinate Yb of the projected point is expressed by the equation Yb=Yi−(Ya−Yi)*Z0/(Za−Z0), where Ya is the Y-coordinate of the three-dimensional model data point, Yi is the Y-coordinate of the light filtering aperture of number I, Za is the distance from the three-dimensional model data point to the image screen, Z0 is the distance between the light filtering screen and the image screen, Yb is the Y-coordinate of Ya on the image screen.

5. The stereoscopic display method utilizing the stereoscopic display device with liquid crystal shutter light filter for naked eye viewing as in claim 1, wherein: in the steps (2) and (3), the stereo image is displayed by displaying multiple sets of recording units, which means a single frame HR is formed by m recording units R where the phase of each light filtering matrix of each recording unit R is different from each other, and when m light filtering matrixes of different phases coincide, light filtering points of the light filtering matrixes fill all the light filtering apertures of the light filtering screen, and m recording units R of the single frame HR are displayed by the personal computer utilizing the dual display card at high speed according to their order numbers, that is when the light filtering images B and the continuous parallax images W of the m recording units are displayed simultaneously at high speed on the light filtering screen and the image screen respectively according to their order numbers, viewers in front of the light filtering screen can see the dynamic stereo image in high resolution; and display time for displaying each recording unit R at high speed is $\leqq$:0.1/m second.

6. The stereoscopic display method utilizing the stereoscopic display device with liquid crystal shutter light filter for naked eye viewing as in any one of the claims 1 to 5, wherein when there are a plurality of the recording units R and the phase of the light filtering matrix of each recording unit R is different, the order numbers of each recording unit R is sorted randomly without order, each recording unit R is displayed according to the new order number after random sorting.

7. The stereoscopic display method utilizing the stereoscopic display device with liquid crystal shutter light filter for naked eye viewing as in claim 1, wherein the light filtering image is a raster image with only vertical lines which is obtained through controlling the light filtering screen to open the light filtering apertures according to the vertical lines.

\* \* \* \* \*